United States Patent [19]
Takahashi et al.

[11] 3,816,253
[45] June 11, 1974

[54] METHOD FOR THE PRODUCTION OF CEPHALOSPORINS

[75] Inventors: Takeshi Takahashi; Yoshio Yamazaki, both of Osaka; Koichi Kato, Kobe; Masao Isono, Nishinomiya, all of Japan

[73] Assignee: Takeda Chemical Industries, Inc., Osaka, Japan

[22] Filed: Mar. 31, 1972

[21] Appl. No.: 240,285

[30] Foreign Application Priority Data
Apr. 2, 1971  Japan.................................. 46-20586

[52] U.S. Cl..................... 195/29, 195/36 R, 195/66
[51] Int. Cl............................................... C12d 9/00
[58] Field of Search .................. 195/36 R, 36 P, 29

[56] References Cited
UNITED STATES PATENTS
| | | | |
|---|---|---|---|
| 3,507,861 | 4/1970 | Morin et al. ....................... | 195/36 R |
| 3,682,777 | 8/1972 | Nara et al........................... | 195/36 P |
| 3,717,548 | 2/1973 | Nara et al........................... | 195/36 P |

*Primary Examiner*—Alvin E. Tanenholtz
*Attorney, Agent, or Firm*—Wenderoth, Lind & Ponack

[57] ABSTRACT

Cephalosporins of the formula

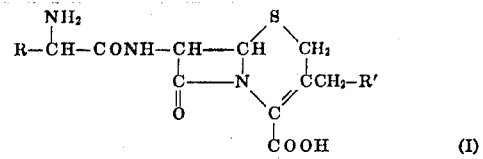

(I)

wherein R stands for a six-membered cyclic hydrocarbon residue or a five-membered heterocyclic residue and R' stands for a hydrogen atom or an organic radical the indicated linkage of which is that between the methylene carbon atom and an oxygen, sulfur or nitrogen atom composing the organic radical, are produced by condensation between (1) an α-substituted-α-amino acid of the formula

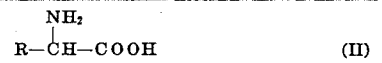

(II)

wherein R has the aforementioned significance, or its reactive derivative and (2) a 7-aminocephem compound of the formula

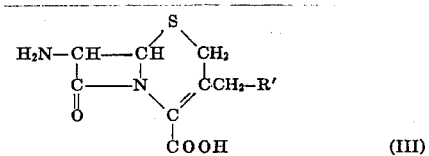

(III)

wherein R' has the aforementioned significance through the utilization of a microorganism having a novel type of enzymatic activity. The compounds have strong antibacterial action against gram-positive and gram-negative bacteria.

17 Claims, No Drawings

METHOD FOR THE PRODUCTION OF CEPHALOSPORINS

The present invention relates to a novel and industrially advantageous method for the production of cephalosporins.

More particularly, the present invention relates to a method for producing a cephalosporin of the formula

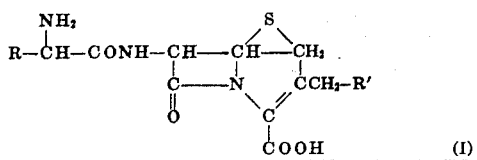

wherein R stands for a six-membered cyclic hydrocarbon residue or a five-membered heterocyclic residue and R' stands for a hydrogen atom or an organic radical the indicated linkage of which is that between the methylene carbon atom and an oxygen, sulfur or nitrogen atom composing the organic radical, by condensation between (1) an α-substituted-α-amino acid of the formula

wherein R has the aforementioned significance, or its reactive derivative and (2) a 7-aminocephem compound of the formula

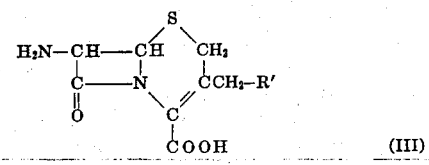

wherein R' has the aforementioned significance through the utilization of a microorganism having a novel type of enzymatic activity.

Hitherto, the production of cephalosporins by the condensation reaction between α-substituted-α-amino acids and 7-aminocephem compounds has been carried out by means of chemical reactions. However, it is required in these known methods either to previously protect amino group of the amino acids to avoid undesirable side reactions or to previously convert the amino group into a radical such as azide group ($N_3$) which can be reconverted into amino group. Thus, it is necessary after the condensation reaction either to remove the protective group from the amino group or to reconvert said radical into amino group, and these side-step procedures must be conducted under moderate conditions so as not to give any influence on the moieties other than that concerned with these reactions, especially so as not to split the cephem nucleus or the acid amide linkage in the side chain at its 7-position. These side-step procedures inevitably decrease the yield of the objective cephalosporins.

The present inventors have unexpectedly found that among the microorganisms of the genera *Mycoplana, Protaminobacter, Acetobacter* (inclusive of the genus *Gluconobacter, Acetobacter* according to "Bergey's Manual of Determinative Bacteriology," 7th ed., 1957), *Xanthomonas, Pseudomonas, Aeromonas, Escherichia, Staphylococcus, Arthrobacter, Proteus, Corynebacterium, Flavobacterium, Clostridium, Spirillum* and *Bacillus* there exist at a high frequency those microorganisms having a novel type of enzymatic activity, which is capable of producing a cephalosporin (I) from an α-substituted-α-amino acid (II) or its reactive derivative and a 7-aminocephem compound (III), and that the cephalosporins (I) can be smoothly produced in a high yield by subjecting (1) the α-substituted-α-amino acids (II) or their reactive derivatives and (2) the 7-aminocephem compounds (III) to an enzymatic action of these microorganisms. As far as the present inventors are aware, the microbial condensation reaction between an organic acid or its reactive derivative and a 7-aminocephem compound to produce a cephalosporin was not known prior to this invention and has been found and established by the present inventors.

Thus, the principal object of the present invention is to provide a microbial method for producing cephalosporins (I) from α-substituted-α-amino acids (II) or their reactive derivatives and the 7-aminocephem compounds (III), which is novel and far more advantageous than the known chemical methods.

Further objects of the present invention will become apparent as the following specification proceeds.

Referring to the above-described formula (I), R is a six-membered cyclic hydrocarbon residue or a five-membered heterocyclic residue. As the six-membered cyclic hydrocarbon residue there are counted phenyl, cyclohexenyls (i.e., 1-cyclohexenyl, 2-cyclohexenyl and 3-cyclohexenyl), cyclohexadienyls (i.e., 1,3-cyclohexadienyl, 1,4-cyclohexadienyl, 1,5-cyclohexadienyl and 2,5-cyclohexadienyl) and cyclohexyl. As the five-membered heterocyclic residue there may be mentioned those containing one hetero atom from among O, S and N, for example, thienyl (2-thienyl or 3-thienyl), furyl (2-furyl or 3-furyl) and the like. Each of these hydrocarbon residues and heterocyclic residues may have a substituent or substituents on its ring. The substituents may be exemplified by hydroxy; halogens (e.g., bromine and chlorine); alkyls such as lower alkyl (e.g., methyl, ethyl, isopropyl, allyl and octyl); alkoxys such as lower alkoxy (e.g., methoxy, ethoxy, isopropoxy, allyloxy and hexoxy); carboxyl; mercapto; cyano; nitro; sulfo; amino; sulfamino; carboxyalkyl such as carboxy-loweralkyl (e.g., carboxymethyl and carboxyethyl) and the like. In the formula I, R' represents a hydrogen or an organic radical the indicated linkage of which is that between the methylene carbon atom at the 3-position and an oxygen, sulfur or nitrogen atom contained in the organic radical. As said organic radical, there may be enumerated, for example, alkoxys such as lower alkoxy (e.g., methoxy, ethoxy, isopropoxy, allyloxy and hexoxy), alkoxycarbonyls such as lower alkoxycarbonyls (e.g., methoxycarbonyl, ethoxycarbonyl, isopropoxycarbonyl, allyloxycarbonyl and hexoxycarbonyl), pyridylthios (2-pyridylthio and 3-pyridylthio), pyridinio (e.g.,

or

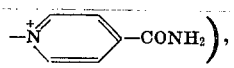

1-oxidopyrid-2-ylthio, methylthiocarboxy, dimethyldithiocarbamyl, trimethylamino, azido, benzyloxycarbonylamino and the like.

Referring to the formula (II), R is one of the above-mentioned hydrocarbon or heterocyclic residues. Thus, the α-substituted-α-amino acid (II) includes, among others, phenylglycine, cyclohexadienylglycine, cyclohexenylglycine, cyclohexylglycine, 2-thienylglycine, 2-furylglycine, p-hydroxyphenylglycine, p-mercaptophenylglycine, p-carboxyphenylglycine, p-sulfophenylglycine, p-aminophenylglycine, m-aminophenylglycine, p-nitrophenylglycine, p-chlorophenylglycine, o-chlorophenylglycine, p-bromophenylglycine, p-methylphenylglycine, p-ethylphenylglycine, p-methoxyphenylglycine, p-cyanophenylglycine, m-cyanophenylglycine, p-sulfaminophenylglycine and the like. The α-substituted-α-amino acids (II) having two or more substituents of the same or different kinds on their rings are also employable. As the substituents on the rings in this case, optional combinations of various substituents mentioned above may be chosen. Though there are some new compounds among these α-substituted-α-amino acids (II), they can be easily prepared by, for example, Strecker's reaction from aldehydes having the corresponding R groups.

The reactive derivatives of these α-substituted-α-amino acids (II) are those derivatized at their carboxylic moiety which yield the α-substituted-α-amino acids (II) when hydrolyzed in an aqueous medium by the microorganism to be employed in the present invention. Typical examples of the reactive derivatives are alkyl esters such as lower alkyl esters (e.g., methyl esters, ethyl esters, isopropyl esters and octyl esters) of the α-substituted-α-amino acids (II), aralkyl esters such as phenyl lower alkyl esters (e.g., benzyl esters and phenethyl esters) of the same, thioesters (e.g., thioglycol esters) of the same, amides of the same, dipeptides between the same and another amino acid (e.g., N-(phenylglycyl)glycine) and the like. Hereinafter, the α-substituted-α-amino acid (II) and its reactive derivative are collectively referred to as "α-substituted-α-amino acid compound."

There are optical isomers regarding the respective α-substituted-α-amino acid compounds and it is recommended from the antibacterial activities of the resulting cephalosporins (I) to employ D-forms or DL-forms with regard to the α-carbon atom of these compounds.

The α-substituted-α-amino acid compound may be employed in the free form or as its salt, e.g., hydrochloride, sodium salt or potassium salt.

R' in the formula (III) is a hydrogen atom or one of the above-mentioned organic radicals. Thus, the typical examples of the 7-aminocephem compounds (III) are 7-amino-cephalosporanic acid, 7-amino-3-deacetoxycephalosporanic acid, 7-amino-3-methoxymethyl-3-cephem-4-carboxylic acid, 7-amino-3-(1-oxidopyrid-2-yl thiomethyl)-3-cephem-4-carboxylic acid, N-(7-amino-3-cephem-3-ylmethyl)pyridinium-4-carboxylate, N-(7-amino-3-cephem-3-ylmethyl)4-carboxamidopyridinium-4-carboxylate, 7-amino-3-methylthiocarboxy-methyl-3-cephem-4-carboxylic acid, 7-amino-3-trimethyl-aminomethyl-3-cephem-4-carboxylic acid, 7-amino-3-dimethyldithiocarbamylmethyl-3-cephem-4-carboxylic acid, 7-amino-3-azidomethyl-3-cephem-4-carboxylic acid, 7-amino-3-benzyloxycarbonylaminomethyl-3-cephem-4-carboxylic acid and the like. These 7-aminocephem compounds are known and preparable by per se established processes, e.g., as are described in "Advances in Applied Microbiology," 13(1970), p.p. 163–236, published by Academic Press, Inc., New York and London. Each of those 7-aminocephem compounds (III) may be used in the form of the free acid or as its salt e.g., hydrochloride, sodium salt or potassium salt.

According to the method of the present invention, use is made of microorganisms which belong to a genus Mycoplana, Protaminobacter, Acetobacter, Xanthomonas, Pseudomonas, Aeromonas, Escherichia, Staphylococcus, Arthrobacter, Proteus, Corynebacterium, Flavobacterium, Clostridium, Spirillum or Bacillus and which are capable of producing a cephalosporin of the formula (I) from an α-substituted-α-amino acid compound and a 7-aminocephem compound (III). These microorganisms can be selected from among the known cultures which are stored at microorganism depositories and also be isolated from the natural kingdom, e.g., the soil, sewage water, marine water, flowers, fruits and the atmosphere.

The selection of the microorganisms having said cephalosporin-synthesizing activity may be conducted by, for example, suspending each of the microorganisms to be examined in an aqueous solution (pH 6.0) containing 10 mg./ml. of D-phenylglycine methyl ester and 5 mg./ml. of 7-amino-3-deacetoxycephalosporanic acid, incubating the suspension under shaking at 37°C for 30 minutes and checking the accumulated 7-(α-amino-D-phenylacetamido)-3-deacetoxycephalosporanic acid in the reaction mixture by the bioautography and the bioassay described hereinafter. Among thus-selected microorganisms there may be most advantageously employed those microorganisms which give 7-(α-amino-D-phenylacetamide)-3-deacetoxycephalosporanic acid in an amount of not less than 1 mg./ml. in the reaction mixture according to said selection procedure.

If a microorganism selected as above produces the undesirable enzymes which will act upon and convert the objective cephalosporins (I), such as β-lactamase II (cephalosporinase) or esterases, it is possible to derive mutants, which do not produce those undesirable enzymes, by subjecting said microorganism to a per se conventional technique for the mutation of microorganisms, such as X-ray irradiation, ultraviolet ray irradiation or nitrogen mustardtreatment.

All the mutants that are derived from the above selected microorganisms by conventional means and that have an improved cephalosporin-synthesizing activity can, of course, be utilized to advantage in the practice of this invention.

The following is a partial listing of the known cultures stored at the Institute for Fermentation, Osaka, Japan and which are employable in the method of the present invention. Throughout the present specification the IFO numbers mean the accession numbers of the microorganisms at said Institute: *Acetobacter acetosus* IFO-3296, *Acetobacter albidus* IFO-3251, *Acetobacter aurantium* IFO-3245, IFO-3249, *Acetobacter cerinus* IFO-3262, *Acetobacter industrius* IFO-3260, *Acetobacter dioxyacetonicus* IFO-3272, *Acetobacter gluconicus* IFO-3171, *Acetobacter liquefaciens* IFO-12388, *Acetobacter melanegenus* IFO-3293, *Acetobacter oxydans* IFO-3189, *Acetobacter pasteurianus* IFO-3223, *Acetobacter suboxydans* IFO-3130, *Acetobacter turbidans* IFO-3225, *Acetobacter xylinum* IFO-3144, IFO-3288, *Xanthomonas citri* IFO-3835, IFO-3829, *Xanthomonas pruni* IFO-3780, *Xanthomonas oryzae* IFO-3995, IFO-3827, IFO-3828, IFO-3510, *Pseudomonas aeruginosa* IFO-3454, *Pseudomonas maltophila* IFO-12690, *Pseudomonas melanogenum* IFO-12020, *Pseudomonas vendrelli* IFO-3899, *Aeromonas hydrophila* IFO-3820, *Arthrobacter simplex* IFO-12069, *Arthrobacter oxydans* IFO-12138, *Proteus mirabilis* IFO-3849, *Proteus morganii* IFO-3848, *Corynebavterium tritici* IFO-12164, *Flavobacterium capsulatum* IFO-12533, *Clostridium butyricum* IFO-3847, *Clostridium acetobutyricum* IFO-3346, *Staphylococus aureus* IFO-3060, *Spirillum metamorphum* IFO-12012, *Bacillus subtilis* IFO-3035, *Bacillus sphaericus* IFO-3526, *Bacillus firmus* IFO-3330, *Bacillus pumilus* IFO-12090, *Escherichia coli* IFO-3543 and *Escherichia coli var. communior* IFO-3550.

Among the strains selected from the natural kingdom there are enumerated, for example, *Mycoplana dimorpha* IFO-13213 (ATCC-21759), IFO-13240 (ATCC-21756), *Mycoplana bullata* IFO-13267 (ATCC-21779), *Protaminobacter alborflavus* IFO-13221 (ATCC-21755) and *Acetobacter sp.* IFO-13209 (ATCC-21760). The ATCC numbers indicate the accession numbers of the microorganisms at American Type Culture Collection, Rockville, Md., U.S.A.

Those microorganisms which are capable of producing a cephalosporin (I) from an α-substituted-α-amino acid compound and a 7-aminocephem compound (III) can be found among the above-mentioned fifteen genera. Especially, the microorganisms which give advantageous results can be found at a high frequency among the genus *Mycoplana*, the genus Protaminobacter, the genus *Acetobacter*, the genus *Xanthomonas*, the genus *Pseudomonas* and the genus *Aeromonas*, said six genera belonging to the family *Pseudomonadaceae*. The genus *Escherichia* also gives good results.

In subjecting (1) an α-substituted-α-amino acid compound and (2) a 7-aminocephem compound to the enzymatic action of such a microorganism having said cephalosporin-synthesizing activity, it is possible to cultivate such a microorganism in a culture medium containing (1) an α-substituted-α-amino acid compound and (2) a 7-aminocephem compound, but it is generally recommended to previously cultivate such a microorganism in an ordinary culture medium and to employ the resulting culture broth or its processed material.

The cultivation of the microorganisms may be conducted under aeration with agitation, under shaking or under static conditions. Generally, the cultivation under aerobic conditions is advantageous.

As the culture medium, there may be employed those which contain one or more of the combinations of meat extract, yeast extract, peptone, casein hydrolysates, cornsteep liquor and other natural substances employed for general cultivation. These media may be optionally supplemented with carbon sources e.g., sugars, organic acids, normal paraffins; inorganic or organic nitrogen-containing compounds containing nitrogen in amino form and/or nitrate form; phosphates; manganese salts, sodium chloride, other ionic metals and/or vitamins. The media are preferably adjusted to pH 6 to 8. The advantageous cultivation temperatures are from 20° to 40°C, especially from 28° to 37°C. Though the cultivation period varies with the cultivation apparatus, the medium composition, the cultivation temperature and the like, it is recommended to stop the cultivation at the time when the cephalosporin-synthesizing activity reaches the maximum, from the late stage of the logarithmic growth phase to the early stage of the stationary phase. Generally, the cultivation for 8 to 30 hours gives the good results.

Thus-obtained culture broths or their processed materials are employable for the enzymatic synthesis of cephalosporins (I) in the method of the present invention. The term "processed materials of culture broths" as used throughout this specification as well as Claims means all the materials prepared by subjecting the culture broths to a suitable treatment or treatments to increase the cephalosporin-synthesizing activity and to make into an advantageous form for the enzymatic reaction. For instance, when said synthesizing activity occurs intracellularly, the processed material may be any of such preparations as the cells which have been separated from the culture broth; the cell-free extract which is obtainable by the application of a known process to the cells; a partially purified or completely purified enzyme preparation having the cephalosporin-synthesizing activity which is obtainable by the application of a per se known purification technique to said cell-free extract; and the material having the cephalosporin-synthesizing activity which has been obtained by combining said partially or completely purified enzyme to a water-insoluble high molecular substance by physical or chemical means. When the synthesizing activity occurs extracellularly, the term implies, among others, the supernatant fluid which is obtainable upon removal of cells from the culture broth; the partially or completely purified enzyme having the cephalosporin-synthesizing activity which is obtainable by subjecting said supernatant fluid to a known enzyme purification procedure; and the material having the cephalosporin-synthesizing activity which has been obtained by combining the partially or completely purified enzyme to a water-insoluble high molecular substance by physical or chemical means.

The condensation reaction between (1) an α-substituted-α-amino acid compound and (2) a 7-aminocephem compound to give a corresponding cephalosporin (I) smoothly proceeds by contacting both the compounds with the above-mentioned culture broth or its processed material in an aqueous medium. The term "an aqueous medium" as used throughout the present specification as well as appended Claims means "a medium comprising water mainly." Thus, the aqueous medium may contain a water-miscible organic solvent such as lower alcohol (e.g., methanol, ethanol or isopropanol), acetone or the like. The preferred concentration of such an organic solvent is less than about 40 percent by volume, more preferably less than about 20 percent by volume, relative to the whole volume of the ultimate medium. It is generally recommended to adjust the aqueous medium to a pH from about 4 to about 8, most advantageously to a pH from about 5 to about 7. Though the reaction period varies with the substrate concentration, the level of the cephalosporin-synthesizing activity of the culture broth or processed material employed, the reaction temperature and the like, it generally lies in a range from about 10 to about 300 minutes. The reaction temperature may be advantageously chosen in a range from about 5° to about 50°C, most advantageously from about 20° to about 40°C. The substrate concentration may be chosen mainly depending upon the level of the cephalosporin-synthesizing activity. Generally, the concentration of the 7-aminocephem compound (III) relative to the whole aqueous medium is chosen from a range from about 0.1 to about 10 percent (weight-/volume), while that of the α-substituted-α-amino acid compound is chosen from a range from about 0.1 to about 20% (weight/volume). Advantageously, the α-substituted-α-amino acid compound is employed in a concentration of at least equimole, advantageously of not less than 2 time-moles, relative to the 7-aminocephem compound used.

When use is made of a processed material of culture broth which is water-insoluble, the reaction may be carried out in a suspension or by passing an aqueous solution containing said α-substituted-α-amino acid compound and said 7-aminocephem compound (III) through a column packed with the water-insoluble material having the cephalosporin-synthesizing activity.

By the above-mentioned enzymatic reaction, the cephalosporin (I) is produced in the reaction mixture. When a DL-form is employed as the α-substituted-α-amino acid compound, there is generally observed a tendency that the D-form of the α-substituted-α-amino acid compound is predominantly introduced into the cephalosporin (I). Throughout the present invention, the D- or L-indication of the cephalosporins (I) means D-form or L-form with regard to the α-carbon atom in the side-chains at 7-position of these compounds (I).

Thus-produced cephalosporin (I) may be easily recovered from the reaction mixture and purified under moderate conditions by per se known techniques, for example, by chromatography or by using an organic acid which is capable of forming a water-insoluble salt with the cephalosporin (I).

Among thus-produced cephalosporins (I) there are included some novel compounds. More particularly, the novel compounds are those cephalosporins having cyclohexenyl(1-cyclohexenyl, 2-cyclohexenyl or 3-cyclohexenyl) as R in the the formula (I), such as 7-(α-amino-1'-cyclohexenylacetamido)-3-deacetoxy-cephalosporanic acid, 7-(α-amino-1'-cyclohexenylacetamido)-cephalosporanic acid and 7-(α-amino-1'-cyclohexenylacetamido)-3-methoxymethyl-3-cephem-4-carboxylic acid. These novel cephalosporins are characterized by their excellent antibacterial activities as well as stabilities.

The cephalosporins (I) have a strong antibacterial action against gram-positive bacteria and gram-negative bacteria. They can be readily absorbed from the small intestines by oral administration, and, in parenteral administration, and they are rapidly penetrated into tissues and have good affinity to tissues. Therefore, the cephalosporins (I) are useful as antibacterial agents.

The cephalosporins (I) including their pharmaceutically acceptable acid salts (e.g., sodium and potassium salts) as well as hydrates thereof may be orally or parenterally administered per se or in a suitable form such as powder, granules, tablets or injectable solution admixed with a pharmaceutically acceptable carriers, diluents or adjuvants. They can be used against almost the same disease that can be cured by α-aminobenzylpenicillin as well as the diseases caused by *Escherichia coli*, or the like.

While the dose of the compounds (I) to be administered varies depending on the kinds of the compounds, the severity of the disease etc., it generally falls within the range of from 5 to 500 mg./kg/day, preferably 10 to 200 mg./kg./day.

The following Examples are intended merely to illustrate presently preferred embodiments of the present invention and not to restrict the scope of the present invention.

Rererence illustrates the typical procedures for preparing 1-cyclohexenylglycine methyl ester, a novel compound employed as one of the α-substituted-α-amino acid compounds in Examples.

Throughout the specification, the abbreviations "mμ," "μg.," "mg.," "ml.," "l.," "°C," "M" and "N" respectively refer to "millimicrons," "microgram(s)," "milligram(s)," "milliliter(s)," "liter(s)," "degrees centigrade," "molar concentration" and "normality"; percents are weight per volume, i.e., "grams per deciliter," unless otherwise specified; and "IR," "UV" and "NMR" mean "infrared," "ultraviolet" and "nuclear magnetic response," respectively.

Throughout the following Examples the bioautography as well as the bioassay of the produced cepholosporins were conducted in the conventional technique for cephalosporins employing *Bacillus subtilis* PCI 219, as is described in "Journal of Bacteriology", 50, 701–709-(1945); meanwhile the enzyme assay of the produced cephalosporins was carried out by subjecting the reaction mixture containing the objective cephalosporin to the action of β-lactamase produced by "Aerobacter cloaceae (this enzyme splits the lactam of cephalosporins (I) but cannot split the lactam of starting 7-aminocephem compounds) and determining the difference in the absorbance at 260 mμ between before and after the enzyme treatment.

Media I to IV employed in the Examples have the following composition, respectively:

Medium I
  Bacto-Nutrient Broth, dehydrated
  (commercially available, distributed by
  Difco Laboratories, U.S.A.)    0.8%
  Glucose    1.0%
  NaCl    0.5%
      pH 7.0

Medium II
  Monosodium glutamate    0.5%
  Phenylacetic acid    0.3%

-Continued

| | |
|---|---|
| Urea | 0.2% |
| Potassium dihydrogenphosphate | 0.05% |
| Dipotassium hydrogenphosphate | 0.05% |
| $MgSO_4 \cdot 7H_2O$ | 0.1% |
| pH 7.3 | |

Medium III

| | |
|---|---|
| Monosodium glutamate | 0.2% |
| Yeast extract | 0.2% |
| Peptone | 0.5% |
| Dipotassium hydrogenphosphate | 0.2% |
| Magnesium chloride | 0.1% |
| $FeSO_4 \cdot 7H_2O$ | 0.01% |
| Sucrose | 2.0% |
| pH 7.2 | |

Medium IV

| | |
|---|---|
| Meat Extract | 1.0% |
| Peptone | 1.0% |
| NaCl | 0.5% |
| pH 7.0 | |

REFERENCE

Preparation of DL-1-cyclohexenylglycine:

A solution of 4.4 g. of 1-cyclohexene-1-aldehyde in 8 g. of methanol is added to a solution of 2 g. of sodium cyanide and 2.36 g. of ammonium chloride in 8 ml. of water and the mixture is stirred at room temperature for 2 hours, at the end of which time 20 ml. of water is added. The resulting aminonitrile compound is extracted with 20 ml. of benzene. The benzene layer is extracted three times with 10 ml. each of 6N-hydrochloric acid, respectively, and the aqueous layer is refluxed for 2 hours. The resinous matter is removed with activated carbon and the filtrate is concentrated to about 15 ml. and brought to about pH 5.0 with concentrated aqueous ammonia (28%), whereupon crude crystals of DL-1-cyclohexenylglycine is separated out. The crystals are recovered by filtration and dissolved in 1N-aqueous solution of sodium hydroxide. To the solution is added activated carbon and the mixture is subjected to filtration. To the filtrate, ethanol (one-half volume of the filtrate) is added, and the mixture is boiled, followed by adjusting its pH about 5.0 with hydrochloric acid, whereby 1.1 g. of DL-1-cyclohexenylglycine as colorless flakes melting at 242°–243°C is obtained.

IR(KBr, $cm^{-1}$):

3160, 2960, 1605, 1490, 1400, 1345, 1274, 1145, 720.

NMR (solvent: 1N-NaOD):

1.5 – 2.4 (multiplet, 8H)
3.81 (singlet, 1H, —CH — COOH)
5.84 (multiplet, 1H, —CH = C—)

Preparation of DL-1-cyclohexenylglycine methyl ester:

10 g. of DL-1-cyclohexenylglycine is suspended into 100 ml. of methanol. While the resulting suspension is cooled at about −15°C, 80 g. of thionyl chloride is dropwise added thereto. After the addition of thionyl chloride, the mixture is kept standing at 4°C for 3 days. The mixture is concentrated under reduced pressure and the resulting residue is crystallized from 20 ml. of a mixture of methanol and diethyl ether (1:1 by volume) to give about 10 g. of DL-1-cyclohexenylglycine methyl ester.

NMR(in $D_2O$), δ(mmp):

$1.7^B$ (4protons on the C-4 and C-5 carbons of the ring), $2.05^B$ (4 protons on the C-2 and C-6 carbons of the ring), $3.92^S$ (3 protons of the methyl group), $4.64^S$ (1 proton on the α-carbon), $6.21^B$ (1 proton on the olefinic carbon of the ring).

Notes:
S; singlet
B; broad

Preparation of D-1-cyclohexenylglycine methyl ester:

To a solution of 10 g. of DL-1-cyclohexenylglycine methyl ester hydrochloride in 1,000 ml. of water adjusted to pH 7.2 with the addition of 2N-sodium hydroxide is added 1 g. of a commercially available chymotrypsin ("α-Chymotrypsin" sold by Sigma Chemical Company, Missouri, U.S.A.; It shows 50 units/mg. of chymotrypsin activity). The mixture is incubated at 23°C for 2 hours with adjusting its pH to 7.2 by the addition of 1N-sodium hydroxide.

After adjusted to pH 8.0 with the addition of 5N-sodium hydroxide, the reaction mixture is subjected to extraction five times with 1,300 ml. each of diethyl ether. The resulting diethyl ether layer is evaporated to dryness at 25°C under reduced pressure to give brown oily residue. To the residue is added 100 ml. of HCl-saturated methanol and the mixture is concentrated under reduced pressure. To the resulting residue is dropwise added 30 ml. of diethyl ether and the mixture is concentrated to give 3.5 ml. of D-1-cyclohexenylglycine methyl ester. Its specific rotation is $[\alpha]_D^{25} = -115°$ (C = 0.5, 0.1N-HCl). Its NMR spectrum is identical with that of DL-1-cyclohexenylglycine methyl ester.

EXAMPLE 1

The respective 3-day slant cultures of the microorganisms listed in Table 1 below were inoculated into three flasks containing 30 ml. of Medium I each, and grown under shaking at 28°C for 20 hours, at the end of which time the cells were harvested by centrifugation. The cells were washed with 30 ml. of a 0.05M-phosphate buffer solution of pH 6.0 and suspended in 3 ml. of said buffer solution. To each of the suspensions was added 3 ml. of a 0.1N-aqueous solution of $K_2HPO_4$ containing 4% of phenylglycine methyl ester (1) and 2% of one of 7-aminocephalosporanic acid (a), 7-amino-3-deacetoxycephalosporanic acid (b) and 7-amino-3-methoxymethyl-3-cephem-4-carboxylic acid (c), the solution having been adjusted to pH 6.0 with 2N-HCl. Each of the mixtures was incubated under shaking at 37°C for 40 minutes. The cephalosporin accumulated in each of the reaction mixtures was identified by the bioautography and determined by the bioassay.

The results are summarized in Table 1 below:

Table 1

| Microorganism | | Amount of accumulated cephalosporin (mg./ml.) | | |
|---|---|---|---|---|
| | | A | B | C |
| Mycoplana dimorpha | IFO-13213 | 2.1 | 1.8 | 1.5 |
| Mycoplana bullata | IFO-13267 | 0.6 | 0.1 | 0.2 |
| Protaminobacter alboflavus | IFO-13221 | 6.5 | 2.3 | 3.6 |
| Acetobacter acetosus | IFO-3296 | 1.3 | 0.1 | 1.1 |
| Acetobacter albidus | IFO-3251 | 0.4 | 0.4 | 0.1 |
| Acetobacter aurantium | IFO-3245 | 6.8 | 0.8 | 3.5 |
| Acetobacter aurantium | IFO-3249 | 7.4 | 1.2 | 2.5 |

Table 1—Continued

| Microorganism | | Amount of accumulated cephalosporin (mg./ml.) | | |
| --- | --- | --- | --- | --- |
| | | A | B | C |
| Acetobacter cerinus | IFO-3262 | 0.9 | 0.4 | 0.3 |
| Acetobacter industrius | IFO-3260 | 0.5 | 0.4 | 0.2 |
| Acetobacter dioxyacetonicus | IFO-3272 | 0.6 | 0.4 | 0.2 |
| Acetobacter gluconicus | IFO-3171 | 0.3 | 0.2 | 0.1 |
| Acetobacter liquefaciens | IFO-12388 | 0.5 | 0.2 | 0.4 |
| Acetobacter melanogenus | IFO-3293 | 2.2 | 1.1 | 0.8 |
| Acetobacter oxydans | IFO-3189 | 1.0 | 1.1 | 0.5 |
| Acetobacter pasteurianus | IFO-3223 | 8.2 | 4.1 | 4.0 |
| Acetobacter suboxydans | IFO-3130 | 1.8 | 1.0 | 0.5 |
| Acetobacter turbidans | IFO-3225 | 6.5 | 5.2 | 4.8 |
| Acetobacter xylinum | IFO-3144 | 8.2 | 4.5 | 2.8 |
| Acetobacter xylinum | IFO-3288 | 8.0 | 4.0 | 4.0 |
| Xanthomonas citri | IFO-3835 | 6.8 | 2.9 | 2.2 |
| Xanthomonas pruni | IFO-3780 | 4.8 | 2.5 | 2.4 |
| Xanthomonas oryzae | IFO-3995 | 8.0 | 8.2 | 3.0 |
| Pseudomonas aeruginosa | IFO-3454 | 0.2 | 0.4 | 0.5 |
| Pseudomonas maltophila | IFO-12690 | 2.0 | 1.0 | 1.2 |
| Pseudomonas melanogenum | IFO-12020 | 3.1 | 0.4 | 1.0 |
| Pseudomonas vendrelli | IFO-3899 | 0.2 | 0.4 | 0.3 |
| Aeromonas hydrophilia | IFO-3820 | 0.1 | 0.1 | 0.1 |

Note: A: 7-($\alpha$-aminophenylacetamido)cephalosporanic acid produced from 1 and a.
B: 7-($\alpha$-aminophenylacetamido)-3-deacetoxycephalosporanic acid produced from 1 and b.
C: 7-($\alpha$-aminophenylacetamido)-3-methoxymethyl-3-cephem-4-carboxylic acid produced from 1 and C.

EXAMPLE 2

A loopful of the respective 3-day slant cultures of the microorganisms listed in Table 2 below was inoculated into 20 ml. of the medium set forth in Table 2 and cultivated under shaking at 28°C for 1 day. Each of the resulting cultures was inoculated into 500 ml. of the same medium as above and cultivated under shaking at 28°C for 20 hours, at the end of which time the cells were harvested by centrifugation. The cells were washed with 500 ml. of a 0.05M- phosphate buffer solution of pH 6.0 and suspended in 50 ml. of said buffer solution. To each of the suspensions was added 50 ml. of a 0.1N-aqueous solution of $K_2HPO_4$ containing 4% of phenylglycine methyl ester (1) and 2% of 7-aminocephalosporanic acid (a), the solution having been adjusted to pH 6.0 with 2N-HCl. Each of the mixtures was incubated under shaking at 37° C for 30 minutes. 7-($\alpha$-aminophenylacetamido)cephalosporanic acid (A) accumulated in each of the reaction mixtures was identified by the bioautography and determined by the bioassay.

The results are summarized in Table 2 below:

Table 2

| Microorganism | | Medium employed for the cultivation of microorganism | Amount of accumulated A (mg/ml) |
| --- | --- | --- | --- |
| Xanthomonas oryzae | IFO-3995 | Medium I | 8.8 |
| Escherichia coli | IFO-3543 | Medium II | 3.5 |
| Escherichia coli var. communior | IFO-3550 | Medium III | 4.3 |
| Staphylococcus aureus | IFO-3060 | Medium I | 1.5 |

EXAMPLE 3

A loopful of a 3-day slant culture of *Acetobacter pasteurianus* IFO-3223 was inoculated into 20 ml. of Medium I and cultivated under shaking at 28°C for 1 day. The resulting culture was inoculated into 500 ml. of Medium I and cultivated under shaking at 28°C for 20 hours. The cells were harvested by centrifugation and washed with 500 ml. of a 0.05 M-phosphate buffer solution of pH 6.0. The washed cells were suspended in 50 ml. of said buffer solution. To the resultant suspension was added 50 ml. of a 0.1 N-aqueous solution of $K_2HPO_4$ containing 4% of phenylglycine ethyl ester (2) and 2% of 7-amino-3-deacetoxycephalosporanic acid (b), the solution having been adjusted to pH 6.0 with 2N-HCl. The mixture was incubated under shaking at 37°C for 30 minutes.

As identified by the bioautography and determined by the bioassay, 6.8 mg./ml. of 7-($\alpha$-aminophenylacetamido)-3-deacetoxycephalosporanic acid (B) was accumulated in the reaction mixture.

EXAMPLE 4

A loopful of the respective 3-day slant cultures of *Acetobacter turbidans* IFO-3225 and Acetobacter aurantium IFO-3245 was inoculated into 20 ml. of Medium I and cultivated under shaking at 28°C for 1 day. The respective cultures were inoculated into 500 ml. of Medium I and cultivated under shaking at 28°C for 20 hours. The cells were harvested by centrifugation and washed with 500 ml. of a 0.05 M-phosphate buffer solution of pH 6.0. The washed cells were suspended in 50 ml. of said buffer solution. To each of the resulting suspensions was added 50 ml. of a 0.1 N-aqueous solution of $K_2HPO_4$ containing 4% of a phenylglycine alkyl ester mentioned in Table 3 and 2% of 7-amino-3-methoxymethyl-3-cephem-4-carboxylic acid, the solution having been adjusted to pH 6.0 with 2N-HCl. The mixture were incubated under shaking at 37°C for 30 minutes. 7-($\alpha$-aminophenylacetamido)-3-methoxymethyl-3-cephem-4-carboxylic acid (C) accumulated in the reaction mixtures was identified by the bioautography and determined by the bioassay.

The results are summarized in Table 3 below:

Table 3

| Microorganism | | Phenylglycine alkyl ester | Amount of accumulated C(mg./ml.) |
|---|---|---|---|
| *Acetobacter turbidans* | IFO-3225 | Methyl ester | 5.8 |
| *Acetobacter aurantium* | IFO-3245 | Ethyl ester | 4.8 |

EXAMPLE 5

The respective 3-day slant cultures of the microorganisms listed in Table 4 below were inoculated into three flasks containing 30 ml. of Medium I each, and grown under shaking at 28°C for 20 hours. The cells were harvested by centrifugation, washed with 30 ml. of a 0.05M-phosphate buffer solution of pH 6.0 and suspended in 3 ml. of said buffer solution. To each of the suspensions was added 3 ml. of a 0.1N-aqueous solution of $K_2HPO_4$ containing 4% of 4-hydroxyphenylglycine methyl ester (3) and 2% of one of 7-aminocephalosporanic acid (a), 7-amino-3-deacetoxycephalosporanic acid (b) and 7-amino 3-methoxymethyl-3-cephem-4-carboxylic acid (c), the solution having been adjusted to pH 6.0 with 2N-HCl. Each of the mixtures was incubated under shaking at 37°C for 30 minutes. The cephalosporin accumulated in each of the reaction mixtures was identified by the bioautography and determined by the bioassay.

The results are summarized in Table 4 below:

Table 4

| Microorganism | | Amount of accumulated cephalosporin (mg./ml.) | | |
|---|---|---|---|---|
| | | D | E | F |
| *Acetobacter pasteurianus* | IFO-3223 | 0.8 | 0.5 | 0.6 |
| *Acetobacter turbidans* | IFO-3225 | 0.7 | 0.7 | 0.6 |
| *Xanthomonas citri* | IFO-3835 | 1.2 | 1.4 | 1.0 |
| *Mycoplana dimorpha* | IFO-13240 | 0.9 | 0.5 | 0.8 |
| *Pseudomonas maltophila* | IFO-12690 | 0.7 | 0.4 | 0.6 |

Note: D: 7-[α-amino-α-(4-hydroxyphenyl)acetamido]cephalosporanic acid produced from 3 and a.
E: 7-[α-amino-α-(4-hydroxyphenyl)acetamido]-3-deacetoxycephalosporanic acid produced from 3 and b.
F: 7-[α-amino-α-(4-hydroxyphenyl)acetamido]-3-methoxymethyl-3-cephem-4-carboxylic acid produced from 3 and c.

EXAMPLE 6

The respective 3-day slant cultures of the microorganisms listed in Table 5 below were inoculated into three flasks containing 30 ml. of Medium I each, and grown under shaking at 28°C for 20 hours, at the end of which time the cells were harvested by centrifugation. The cells were washed with 30 ml. of a 0.05M-phosphate buffer solution of pH 6.0 and suspended in 3 ml. of said buffer solution. To each of the suspensions was added 3 ml. of a 0.1N-aqueous solution of $K_2HPO_4$ containing 4% of 3,5-dichloro-4-hydroxyphenylglycine methyl ester (4) and 2% of one of 7-aminocephalosporanic acid (a), 7-amino-3-deacetoxycephalosporanic acid (b) and 7-amino-3-methoxymethyl-3-cephem-4-carboxylic acid (c), the solution having been adjusted to pH 6.0 with 2N-HCl. Each of the mixtures was incubated under shaking at 37°C for 40 minutes. The cephalosporin accumulated in each of the reaction mixtures was identified by the bioautography and determined by the bioassay.

The results are summarized in Table 5 below:

Table 5

| Microorganism | | Amount of accumulated cephalosporin (mg./ml.) | | |
|---|---|---|---|---|
| | | G | H | I |
| *Acetobacter xylinum* | IFO-3114 | 0.1 | 0.1 | 0.1 |
| *Acetobacter aurantium* | IFO-3245 | 0.1 | 0.1 | 0.1 |
| *Xanthomonas oryzae* | IFO-3995 | 0.2 | 0.1 | 0.2 |
| *Mycoplana dimorpha* | IFO-13240 | 0.1 | 0.1 | 0.1 |

Note:
G: 7-[α-amino-α-(3,5-dichloro-4-hydroxyphenyl)-acetamido]cephalosporanic acid produced from 4 and a.
H: 7-[α-amino-α-(3,5-dichloro-4-hydroxyphenyl)-acetamido]-3-deacetoxycephalosporanic acid produced from 4 and b.
I: 7-[α-amino-α-(3,5-dichloro-4-hydroxyphenyl)-acetamido]3-methoxymethyl-3-cephern-4-carboxylic acid produced from 4 and c.

EXAMPLE 7

The respective 3-day slant cultures of the microorganisms listed in Table 6 below was inoculated into three flasks containing 30 ml. of Medium I each, and grown under shaking at 28°C for 20 hours, at the end of which time the cells were harvested by centrifugation. The cells were washed with 30 ml. of a 0.05M-phosphate buffer solution of pH 6.0 and suspended in 3 ml. of a 0.1N-aqueous solution of $K_2HPO_4$ containing 4% of 1-cyclohexenylglycine methyl ester (5) and 2% of one of 7-aminocephalosporanic acid (a), 7-amino-3-deacetoxycephalosporanic acid (b) and 7-amino-3-methoxymethyl-3-cephem-4-carboxylic acid (c), the solution having been adjusted to pH 6.0 with 2N-HCl. Each of the mixtures was incubated under shaking at 37°C for 30 minutes. The cephalosporin accumulated in each of the reaction mixtures was identified by the bioautography and determined by the bioassay.

The results are summarized in Table 6 below:

Table 6

| Microorganism | | Amount of accumulated cephalosporin (mg./ml.) | | |
|---|---|---|---|---|
| | | J | K | L |
| *Acetobacter xylinum* | IFO-3288 | 1.3 | 1.6 | 0.8 |
| *Acetobacter pasteurianus* | IFO-3223 | 6.8 | 4.6 | 5.2 |
| *Acetobacter turbidans* | IFO-3225 | 7.2 | 4.4 | 4.0 |
| *Acetobacter aurantium* | IFO-3245 | 2.1 | 0.8 | 1.1 |
| *Pseudomonas melanogenum* | IFO-12020 | 2.3 | 2.5 | 1.5 |
| *Pseudomonas maltophila* | IFO-12690 | 0.9 | 1.2 | 0.7 |
| *Xanthomonas oryzae* | IFO-3995 | 7.5 | 7.2 | 7.0 |
| *Mycoplana dimorpha* | IFO-13213 | 1.4 | 2.0 | 1.2 |

Table 6-Continued

| Microorganism | Amount of accumulated cephalosporin (mg./ml.) | | |
|---|---|---|---|
| | J | K | L |

Note: J: 7-(α-amino-1'-cyclohexenylacetamido)cephalosporanic acid produced from 5 and a.
K: 7-(α-amino-1'-cyclohexenylacetamido)-3-deacetoxycephalosporanic acid produced from 5 and b.
L: 7-(α-amino-1'-cyclohexenylacetamido)-3-methoxymethyl-3-cephem-4-carboxylic acid produced from 5 and c.

EXAMPLE 8

A loopful of a 3-day slant culture of Acetobacter pasteurianus IFO-3223 was inoculated into 20 ml. of Medium I and cultivated under shaking at 28°C for 1 day. The resulting culture was inoculated into 500 ml. of Medium I and cultivated under shaking at 28°C for 20 hours. The cells were harvested by centrifugation, washed with 500 ml. of a 0.05 M-phosphate buffer solution of pH 6.0 and suspended in 50 ml. of said buffer solution. To the resulting suspension was added 50 ml. of a 0.1 N-aqueous solution of $K_2HPO_4$ containing 4% of 1-cyclohexenylglycine methyl ester (5) and 2% of 7-aminocephalosporanic acid (a), the solution having been adjusted to pH 6.0 with 2N—HCl. The mixture was incubated under shaking at 37°C for 30 minutes. As identified by the bioautography and determined by the bioassay, 8.5 mg./ml. of 7-(α-amino-1'-cyclohexenylacetamido)cephalosporanic acid (J) was accumulated in the reaction mixture. The product J gives an Rf of 0.83 on a thin layer of silica gel when developed by a 70% aqueous solution of ethanol.

EXAMPLE 9

A loopful of a 3-day slant culture of *Xanthomonas citri* IFO-3835 was inoculated into 20 ml. of Medium I and cultivated at 28°C for 1 day. The resulting culture was inoculated into 200 ml. of Medium I and cultivated at 28°C for 20 hours. The cells were harvested by centrifugation, washed with 200 ml. of a 0.05 M-phosphate buffer solution of pH 6.0 and suspended in 100 ml. of said buffer solution. To the suspension was added 100 ml. of a 0.1 N aqueous solution of $K_2HPO_4$ containing 4% of 1-cyclohexenylglycine thioglycol ester (6) and 2% of 7-aminocephalosporanic acid (a), the solution having been adjusted to pH 6.0 with 2N-HCl. The mixture was incubated under shaking at 37°C for 30 minutes. As identified by the bioautography and determined by the bioassay, 6.6 mg./ml. of 7-(α-amino-1'-cyclohexenyl-acetamido)cephalosporanic acid (J) was accumulated in the reaction mixture.

EXAMPLE 10

A loopful of the respective 3-day slant cultures of *Pseudomonas melanogenum* IFO-12020 and *Acetobacter turbidans* IFO-3225 was inoculated into 20 ml. of Medium I and cultivated under shaking at 28°C for 1 day. The respective cultures were inoculated into 500 ml. of Medium I and cultivated under shaking at 28°C for 20 hours. The cells were harvested by centrifugation, washed with 500 ml. of a 0.05 M-phosphate buffer solution of pH 6.0 and suspended in 50 ml. of said buffer solution. To each of the resulting suspensions was added 50 ml. of a 0.1 N-aqueous solution of $K_2HPO_4$ containing 4% of a 1-cyclohexenylglycine alkyl ester mentioned in Table 7 below and 2% of 7-amino-3-deacetoxycephalosporanic acid (b), the solution having been adjusted to pH 6.0 with 2H-HCl. The mixtures were incubated under shaking at 37°C for 30 minutes. 7-(α -Amino-1'-cyclohexenylacetamido)-3-deacetoxycephalosporanic acid (K) accumulated in the reaction mixtures was identified by the bioautography and determined by the bioassay.

The results are summarized in Table 7 below:

Table 7

| Microorganism | | 1-Cyclohexenyl-glycine alkyl ester | Amount of accumulated K (mg./ml) |
|---|---|---|---|
| Pseudomonas | melanogenum IFO-12020 | Ethyl ester | 3.5 |
| Acetobacter | turbidans IFO-3225 | Methyl ester | 4.2 |

The product K gives an Rf of 0.77 on a thin layer of silica gel when developed by a 70% aqueous solution of ethanol.

EXAMPLE 11

A loopful of the respective 3-day slant cultures of *Acetobacter aurantium* IFO-3245 and *Xanthomonas oryzae* IFO-3995 was inoculated into 20 ml. of Medium I and cultivated under shaking at 28°C for 1 day. The respective cultures were inoculated into 500 ml. of Medium I and cultivated under shaking at 28°C for 20 hours. The cells were harvested by centrifugation, washed with 500 ml. of a 0.05 M-phosphate buffer solution of pH 6.0 and suspended in 50 ml. of said buffer solution. To each of the resulting suspensions was added 50 ml. of a 0.1 N-aqueous solution of $K_2HPO_4$ containing 4% of 1-cyclohexenylglycine methyl ester (5) and 2% of 7-amino-3-methoxymethyl-3-cephem-4-carboxylic acid (c), the solution having been adjusted to pH 6.0 with 2N-HCl. The mixtures were incubated under shaking at 37°C for 30 minutes. 7-(α-Amino-1'-cyclohexenylacetamido)-3-methoxymethyl-3-cephem-4-carboxylic acid (L) accumulated in the reaction mixtures was identified by the bioautography and determined by the bioassay.

The results are summarized in Table 8 below:

Table 8

| Microorganism | | Amount of accumulated L (mg/ml) |
|---|---|---|
| Acetobacter aurantium | IFO-3245 | 3.8 |
| Xanthomonas oryzae | IFO-3995 | 8.2 |

The product L gives an Rf of 0.85 on a thin layer of silica gel when developed by a 70% aqueous solution of ethanol.

EXAMPLE 12

The respective 3-day slant cultures of the microorganisms listed in Table 9 below was inoculated into three flasks containing 30 ml. of Medium I each, and grown under shaking at 28°C for 20 hours, at the end of which time the cells were harvested by centrifugation. The cells were washed with 30 ml. of a 0.05 M-phosphate buffer solution of pH 6.0 and suspended in 3 ml. of a 0.1 N-aqueous solution of $K_2HPO_4$ containing 4% of cyclohexylglycine ethyl ester (7) and 2% of one of 7-aminocephalosporanic acid (a), 7-amino-3-deacetoxycephalosporanic acid (b) and 7-amino-3-methoxymethyl-3-cephem-4-carboxylic acid (c), the solution having been adjusted to pH 6.0 with 2N-HCl. Each of the mixtures was incubated under shaking at 37°C for 30 minutes. The cephalosporin accumulated in each of the reaction mixtures was identified by the bioautography and determined by the bioassay.

The results are summarized in Table 9 below:

Table 9

| Microorganism | | Amount of accumulated cephalosporin (mg/ml) | | |
|---|---|---|---|---|
| | | M | N | O |
| Acetobacter xylinum | IFO-3144 | 1.8 | 0.7 | 1.1 |
| Acetobacter turbidans | IFO-3225 | 2.5 | 2.2 | 1.5 |
| Acetobacter pasteurianus | IFO-3223 | 2.8 | 2.1 | 1.8 |
| Pseudomonas melanogenum | IFO-12020 | 0.9 | 0.8 | 1.0 |
| Pseudomonas maltophila | IFO-12690 | 0.5 | 0.4 | 0.8 |
| Xanthomonas citri | IFO-3835 | 1.8 | 0.3 | 0.9 |
| Xanthomonas oryzae | IFO-3995 | 4.6 | 3.5 | 4.2 |
| Mycoplana dimorpha | IFO-13213 | 1.0 | 0.3 | 0.8 |

Note: M: 7-(α-aminocyclohexylacetamido)cephalosporanic acid produced from 7 and a. N: 7-(α-aminocyclohexylacetamido)-3-deacetoxycephalosporanic acid produced from 7 and b. O: 7-(α-aminocyclohexylacetamido)-3-methoxymethyl-3-cephem-4-carboxylic acid produced from 7 and c.

EXAMPLE 13

A loopful of the respective 3-day slant cultures of the microorganisms listed in Table 10 was inoculated into 20 ml. of Medium I and cultivated under shaking at 28°C for 1 day. Each of the resulting cultures was inoculated into 500 ml. of Medium I and cultivated under shaking at 28°C for 20 hours. The cells were harvested by centrifugation, washed with 500 ml. of a 0.05 M-phosphate buffer solution of pH 6.0 and suspended in 50 ml. of said buffer solution. To each of the resulting suspensions was added 50 ml. of a 0.1 N-aqueous solution $K_2HPO_4$ containing 4% of a cyclohexylglycine alkyl ester described in Table 10 and 2% of a 7-aminocephem compound described in the same Table, the solution having been adjusted to pH 6.0 with 2N-HCl. Each of the mixtures was incubated under shaking at 37°C for 30 minutes. The cephalosporin accumulated in each of the reaction mixtures was identified by the bioautography and determined by the bioassay.

The results are summarized in Table 10 below:

Table 10

| Microorganism | Cyclohexyl-glycine alkyl ester | 7-Aminocephem compound | Accumulated cephalosporin |
|---|---|---|---|
| Acetobacter turbidans IFO-3225 | Ethyl ester | (a) | 3.4 mg/ml of M |
| Xanthomonas oryzae IFO-3995 | Methyl ester | (b) | 5.2 mg/ml of N |
| Pseudomonas melanogenum IFO-12020 | Methyl ester | (c) | 1.8 mg/ml of O |

EXAMPLE 14

A loopful of the respective 3-day slant cultures of the microorganisms listed in Table 11 below was inoculated into 30 ml. of Medium I and cultivated under shaking at 28°C for 20 hours. The cells were harvested by centrifugation, washed with 30 ml. of a 0.05 M-phosphate buffer solution of pH 6.0 and suspended in 3 ml. of said buffer solution. To each of the suspensions was added 3 ml. of a 0.1 N-aqueous solution of $K_2HPO_4$ containing 0.4% of phenylglycine methyl ester (1) and 0.2% of 7-aminocephalosporanic acid (a), the solution having been adjusted to pH 6.0 with 2N-HCl. Each of the mixtures was incubated under shaking at 37°C for 30 minutes. 7-(α-Aminophenyl-acetamido)cephalosporanic acid (A) accumulated in the reaction mixtures was identified by the bioautography and determined by the bioassay.

The results are summarized in Table 11 below:

Table 11

| Microorganism | | Amount of accumulated A (mg/ml) |
|---|---|---|
| Arthrobacter simplex | IFO-12069 | 0.03 |
| Arthrobacter oxydans | IFO-12138 | 0.02 |
| Proteus mirabilis | IFO-3849 | 0.02 |
| Proteus morganii | IFO-3848 | 0.02 |
| Corynebacterium tritici | IFO-12164 | 0.03 |
| Flavobacterium capsulatum | IFO-12533 | 0.04 |
| Clostridium butyricum | IFO-3847 | 0.05 |
| Clostridium acetobutyricum | IFO-3346 | 0.04 |
| Spirillum metamorphum | IFO-12012 | 0.03 |
| Bacillus subtilis | IFO-3035 | 0.03 |
| Bacillus sphaericus | IFO-3526 | 0.04 |
| Bacillus firmus | IFO-3330 | 0.02 |
| Bacillus pumilus | IFO-12090 | 0.04 |

EXAMPLE 15

A loopful of the respective 3-day slant cultures of the microorganisms listed in Table 12 below was inoculated into 30 ml. of Medium I and cultivated under shaking at 28°C for 20 hours. The cells were harvested by centrifugation. The cells were washed with 500 ml. of a 0.05 M-phosphate buffer solution of pH 6.0 and suspended in 15 ml. of said buffer solution. To each of the suspensions was added 15 ml. of a 0.1 N-aqueous solution of $K_2HPO_4$ containing 4% of phenylglycine methyl ester (1) and 2% of 7-amino-3-(1-oxidopyrid-2-ylthiomethyl)-3-cephem-4-carboxylic acid (d), the solution having been adjusted to pH 6.0 with 2N-HCl. Each of the mixtures was incubated under shaking at 37°C for 30 minutes. 7-(α-aminophenylacetamido)-lacetamid 3-(1-oxidopyrid-2-ylthiomethyl)-3-cephem-4-carboxylic acid (P) accumulated in the reaction mixtures was identified by the bioautography and determined by the bioassay.

The results are summarized in Table 12 below:

Table 12

| Microorganism | | Amount of accumulated P (mg/ml) |
|---|---|---|
| Acetobacter pasteurianus | IFO-3223 | 4.4 |
| Acetobacter turbidans | IFO-3225 | 3.5 |
| Acetobacter aurantium | IFO-3245 | 2.4 |
| Pseudomonas maltophila | IFO-12690 | 5.4 |
| Pseudomonas melanogenum | IFO-12020 | 8.8 |
| Xanthomonas citri | IFO-3829 | 7.9 |
| Xanthomonas oryzae | IFO-3827 | 8.6 |
| Protaminobacter alboflavus | IFO-13221 | 5.5 |
| Mycoplana dimorpha | IFO-13213 | 2.1 |

EXAMPLE 16

A loopful of the respective 3-day slant cultures of *Pseudomonas melanogenum* IFO–12020 and *Protaminobacter alboflavus* IFO–13221 was inoculated into 20 ml. of Medium I and cultivated under shaking at 28°C for 1 day. Each of the resulting cultures was inoculated into 500 ml. of Medium I and cultivated under shaking at 28°C for 20 hours. The cells were harvested by centrifugation and washed with 500 ml. of a 0.05 M-phosphate buffer solution of pH 6.0 Then, the cells of the respective microogranisms were suspended in 50 ml. of said buffer solution. To each of the suspensions was added 50 ml. of a 0.1 N-aqueous solution of $K_2HPO_4$ containing 2% of phenyglycine methyl ester (1) and 4% of 7-amino-3-(1-oxidopyrid-2-ylthiomethyl)-3-cephem-4-carboxylic acid (d), the solution having been adjusted to pH 6.0 with 2N-HCl. Each of the mixtures was incubated under shaking at 37°C for 30 minutes. 7-(α-aminophenyl-acetamido)-3-(1-oxidopyrid-2-ylthiomethyl)-3-cephem-4-carboxylic acid (P) accumulated in the reaction mixtures was identified by the bioautography and determined by the bioassay.

The results are summarized in Table 13 below:

Table 13

| Microorganism | | Amount of accumulated P (mg/ml) |
|---|---|---|
| *Pseudomonas melanogenum* | IFO-12020 | 8.5 |
| *Protaminobacter alboflavus* | IFO-13221 | 6.0 |

EXAMPLE 17

A loopful of a 3-day slant culture of *Xanthomonas oryzae* IFO–3995 was inoculated into 20 ml. of Medium I and cultivated under shaking at 28°C for 1 day. The resulting culture was inoculated into 500 ml. of Medium I and cultivated under shaking at 28°C for 20 hours. The cells were harvested by centrifugation, washed with 500 ml. of a 0.05 M-phosphate buffer solution of pH 6.0 and suspended in 50 ml. of said buffer solution. To the resulting suspension was added 50 ml. of a 0.1 N-aqueous solution of $K_2HPO_4$ containing 2% of 2 thienylglycine methyl ester (8) and 4% of 7-aminocephalosporanic acid (a), the solution having been adjusted to pH 6.0 with 2N-HCl. The mixture was incubated under shaking at 37°C for 30 minutes. As identified by the bioautography and determined by the bioassay, 6.2 mg./ml. of 7-[α-amino-(2-thienyl)acetamido]cephalosporanic acid (Q) was accumulated in the reaction mixture.

EXAMPLE 18

A loopful of a 3-day slant culture of *Acetobacter turbidans* IFO–3225 was inoculated into 30 ml. of Medium I and cultivated under shaking at 28°C for 20 hours. The cells were harvested by centrifugation, washed with 30 ml. of a 0.05 M-phosphate buffer solution of pH 6.0 and suspended in 3 ml. of said buffer solution. To the resulting suspension was added 3 ml. of a 0.1 N-aqueous solution of $K_2HPO_4$ containing 2% of 2-thienylglycine methyl ester (8) and 4% of 7-amino-3-deacetoxycephalosporanic acid (b), the solution having been adjusted to pH 6.0 with 2N-HCl. The mixture was incubated under shaking at 37°C for 30 minutes. As identified by the bioautography and determined by the bioassay, 5.6 mg./ml. of 7-[α-amino-(2-thienyl)acetamido]-3-deacetoxycephalosporanic acid (S) was accumulated in the reaction mixture.

EXAMPLE 19

A loopful of the respective 3-day slant cultures of *Xanthomonas oryzae* IFO–3288 and *Acetobacter pasteurianus* IFO–3223 was inoculated into 30 ml. of Medium I and cultivated under shaking at 28°C for 20 hours. The cells were harvested by centrifugation, washed with 30 ml. of a 0.05 M-phosphate buffer solution of pH 6.0 and suspended in 3 ml. of said buffer solution. To each of the resulting suspensions was added 3 ml. of a 0.1 N-aqueous solution of $K_2HPO_4$ containing 4% of phenylglycine methyl ester (1) and 2% of a 7-aminocephem compound described in Table 14 below, the solution having been adjusted to pH 6.0 with 2N-HCl. Each of the mixtures was incubated under shaking at 37°C for 30 minutes. The cephalosporin accumulated in each of the reaction mixtures was identified by the bioautography and determined by the bioassay.

The results are summarized in Table 14 below:

Table 14

| Microorganism | | 7-Aminocephem compound | Accumulated cephalosporin |
|---|---|---|---|
| *Xanthomonas oryzae* | IFO-3288 | (e) | 6.8 mg/ml of T |
| *Acetobacter pasteurianus* | IFO-3223 | (f) | 5.6 mg/ml of U |

Note: e: N-(7-amino-3-cephem-3-ylmethyl)pyridinium-4-carboxylate.
f: N-(7-amino-3-cephem-3-ylmethyl)4-carboxamido-pyridinium-4-carboxylate.
T: N-[7-(α-aminophenylacetamido)-3-cephem-3-ylmethyl]pyridinium-4-carboxylate.
U: N-[7-(α-aminophenylacetamido)-3-cephem-3-ylmethyl]4-carboxamidophyridinium-4-carboxylate.

EXAMPLE 20

A loopful of the respective 3-day slant cultures of

*Acetobacter xylinum* IFO–3144 and *Xanthomonas citri* IFO–3835 was inocluated into 30 ml. of Medium I and cultivated under shaking at 28°C for 20 hours. The cells were harvested by centrifugation, washed with 30 ml. of a 0.05 M-phosphate buffer solution of pH 6.0 and suspended in 3 ml. of said buffer solution in the case of *Acetobacter xylinum* or in 75 ml. of the buffer solution in the case of *Xanthomonas citri*. To each of the resulting suspensions was added the same volume of a 0.1 N-aqueous solution of $K_2HPO_4$ containing 0.4% of phenyglycine (9) and 0.2% of 7-aminocephalosporanic acid (a), the solution having been adjusted to pH 6.0 with 2N-HCl. Each of the mixtures was incubated under shaking at 37°C for 30 minutes. 7-($\alpha$-aminophenylacetamido)-cephalosporanic acid (A) accumulated in the reaction mixtures was identified by the bioautography and determined by the bioassay.

The results are summarized in Table 15 below:

Table 15

| Microorganism | | Amount of accumulated A (mg/ml) |
|---|---|---|
| *Acetobacter xylinum* | IFO-3144 | 0.04 |
| *Xanthomonas citri* | IFO-3835 | 0.06 |

EXAMPLE 21

A loopful of 1-day slant culture of *Xanthomonas citri* IFO–3835 was inoculated into 30 ml. of Medium III and cultivated under shaking at 28°C for 24 hours. The resulting culture was inoculated into 500 ml. of Medium III and cultivated under shaking at 28°C for 24 hours. The cells were harvested by centrifugation and suspended in 20 ml. of a 0.2 M-tris-maleate buffer solution of pH 6.5 To the resulting suspension were added 20 ml. of said buffer solution having been supplemented with 500 mg. of phenylglycine methyl ester (1) as well as 250 mg. of 7-amino-3-deacetoxycephalosporanic acid (b), and 10 ml. of acetone. The mixture was incubated under shaking at 25°C for 30 minutes. As identified by the bioautography and determined by the bioassay, 270 mg. of 7-($\alpha$-aminophenylacetamido)-3-deacetoxycephalosporanic acid (B) was accumulated in the reaction mixture.

EXAMPLE 22

*Acetobacter sp.* IFO–13209 was inoculated into 200 ml. of Medium IV and cultivated under shaking at 28°C for 22 hours. The cells were harvested by centrifugation and suspended in 20 ml. of a 0.1 M-phosphate buffer solution of pH 6.0. The suspension was divided into 8 portions. To each portion of the suspension was added 2.5 ml. of a 0.2 M-phosphate buffer solution of pH 6.0 containing 75 mg. of a phenylglycine derivative described in Table 16 below and 25 mg. of 7-amino-3-deacetoxycephalosporanic acid (b). The respective mixtures were incubated under shaking at 37°C for 1 hour. 7-($\alpha$-Aminophenylacetamido)-3-deacetoxycephalosporanic acid (B) accumulated in the respective reaction mixtures was identified by the bioautography and determined by the bioassay.

The results are summarized in Table 16 below:

Table 16

| Phenylglycine derivative employed | Amount of accumulated B (mg/ml) |
|---|---|
| Methyl ester | 6.0 |
| Ethyl ester | 6.0 |
| n-Propyl ester | 4.6 |
| Isopropyl ester | 2.2 |
| Tertiary-butyl ester | 0.2 |
| Benzyl ester | 4.2 |
| Phenylglycine amide | 0.2 |
| N-(Phenylglycyl)glycine | 0.2 |

EXAMPLE 23

A loopful of a 1-day slant culture of *Xanthomonas oryzae* IFO–3510 was inoculated into 50 ml. of Medium III and cultivated under shaking at 28°C for 1 day. The resulting culture was inoculated into 350 ml. of Medium III and cultivated under shaking 28°C for 1 day. The cells were harvested by centrifugation from 800 ml. of the culture broth obtained in the above-mentioned manner and suspended in 200 ml. of a 0.2 M-phosphate buffer solution of pH 6.0. To the suspension was added 200 ml. of a 0.2 M-phosphate buffer solution of pH 6.0 having been supplemented with 3 g. of DL-1-cyclohexenylglycine methyl ester and 1 g. of 7-amino-3-deacetoxycephalosporanic acid. The mixture was incubated under shaking at 37°C for 1 hour. The enzyme assay revealed that 1.35 g. of 7-($\alpha$-amino-1'-cyclohexenyl-acetamido)-3-deacetoxycephalosporanic acid was accumulated in the reaction mixture.

The cells were removed by centrifugation from the reaction mixture and the resulting supernatant fluid was allowed to pass through a column packed with 800 ml. of a commerically available polystyrene type adsorbent ("Amberlite XAD-2" sold by Rohm & Haas Co., U.S.A.). The column was washed first with 2,600 ml. of water and subsequently with 1,400 ml. of a mixture of water and methanol (5:1 by volume). Then, the column was subjected to elution with 2,500 ml. of a 50% aqueous solution of methanol.

The first 800 ml. of the 50% methanol eluate was evaporated to dryness under reduced pressure at about 35°C, whereby 135 mg. of 7-[$\alpha$-amino(L-1'-cyclohexenyl)acetamido]-3-deacetoxycephalosporanic acid was obtained as crystals.

UV absorption: $E_{1cm}^{1\%}$ at 260 m$\mu$ = 205

Specific rotation: $[\alpha]_D^{25} = +137°(C = 0.5,$ in $H_2O)$

The subsequent 700 ml. of the eluate was evaporated to dryness under reduced pressure at about 35°C, whereby 850 mg. of 7-[$\alpha$-amino-(D-1'-cyclohexenyl)acetamido]-3-deacetoxycephalosporanic acid was obtained as crystals.

UV absorption: $E_{1cm}^{1\%}$ at 260 m$\mu$ = 215

Specific rotation: $[\alpha]_D^{25} = +86.2°(C = 0.5,$ in $H_2O)$

NMR ($\delta$-values in $D_2O$ at pH 3): 1.66(broad, 4H), 2.10(broad, 4H), 2.20(singlet,3H), 3.54(AB type quartet, 2H), 4.63 (singlet, 1H), 5.19(doublet,1H), 5.72(doublet,1H), 6.18(broad,1H), Antibacterial activity: Shown in Table 17:

Table 17

| Test microorganisms | Minimum inhibitory concentration ($\mu$g/ml) |
| --- | --- |
| Staphylococcus aureus 209P | 0.5 |
| Staphylococcus aureus No. 87 | 2 |
| Bacillus subtilis PCI 219 | 0.2 |
| Sartina lutea PCI 1001 | 0.02 |
| Escherichia coli NIHJ | 50 |
| Klebsiella pneumoniae Kb1 | 50 |
| Proteus vulgaris Eb51 | 50 |
| Proteus morganii Eb53 | >100 |
| Proteus morganii Eb54 | >100 |
| Proteus mirabilis Eb59 | 100 |
| Pseudomonas aeruginosa Pd1 | >100 |
| Pseudomonas aeruginosa 10490 | >100 |

EXAMPLE 24

A loopful of a 1-day slant culture of *Xanthomonas citri* IFO–3835 was inoculated into 50 ml. of Medium III and cultivated under shaking at 28°C for 1 day. The resulting culture was inoculated into 350 ml. of Medium III and cultivated under shaking at 28°C for 1 day. The cells were harvested by centrifugation and suspended in 100 ml. of distilled water. To the suspension was added 8 g. of D-phenylglycine methyl ester and 4 g. of 7-amino-3-deacetoxycephalosporanic acid dissolved in 100 ml. of distilled water. The mixture was incubated under shaking at 37°C for 1 hour while controlling its pH to 6.0 with the addition of 2N-NaOH. The enzyme assay revealed that 24.7 mg./ml. of 7-($\alpha$-aminophenylacetamido)-3-deacetoxycephalosporanic acid was accumulated in the reaction mixture.

The reaction mixture was subjected to the same isolation procedure as described in Example 23 to give 3.9g. of 7-($\alpha$-amino-D-phenylacetamido)-3-deacetoxycephalosporanic acid as crystals.

UV absorption: $E_{1cm}^{1\%}$ at 260 m$\mu$ = 218
Specific rotation: $[\alpha]_D^{25} = +148°$(C = 0.5, in $H_2O$)

EXAMPLE 25

A loopful of a 1-day slant culture of *Xanthomonas citri* IFO–3835 was inoculated into 50 ml. of Medium III and cultivated under shaking at 28°C for 1 day. The resulting culture was inoculated into 450 ml. of Medium III and cultivated under shaking at 28°C for 1 day. 2.5 liters of the 1-day culture obtained in the above-mentioned manner was inoculated into 100 liters of Medium III and cultivated under aeration with agitation at 28°C for 24 hours.

The cells were harvested by centrifugation, suspended in 5,000 ml. of a 0.005 M-phosphate buffer solution of pH 6.0 and then sonicated at 10 kilocycles per second for 20 minutes. The resulting sonicates were subjected to the action of deoxyribonuclease, treated with calcium phosphate gel to remove proteins and then treated with 60%-saturated ammonium sulfate solution to give precipitates. The precipitates were dissolved in a 0.01 M-phosphate buffer solution of pH 6.8, dialyzed against running water overnight and then treated with diethylaminoethyl cellulose to remove impure proteins. Thus-obtained solution was lyophilized to give 15 g. of crude powdery enzyme.

3 g. of the crude powdery enzyme was added to 1 liter of an aqueous solution containing 20 g. of D-phenylglycine methyl ester and 10 g. of 7-amino-3-deacetoxycephalosporanic acid. The mixture was incubated with agitation at 37°C for 1 hour while controlling its to pH 6.0 with the addition of 2N-NaOH. The enzyme assay revealed that 11.3 g. of 7-($\alpha$-aminophenylacetamido)-3-deacetoxycephalosporanic acid was accumulated in the reaction mixture.

The reaction mixture was subjected to the same isolation procedure as described in Example 23 to give 9.2 g. of 7-($\alpha$-amino-D-phenylacetamido)-3-deacetoxycephalosporanic acid as crystals.

UV absorption: $E_{1cm}^{1\%}$ at 260 m$\mu$ = 218
Specific rotation: $[\alpha]_D^{25} = +148°$(C=0.5, in $H_2O$)

EXAMPLE 26

The crude powdery enzyme was further subjected to column chromatography with carboxymethyl cellulose employing the phosphate buffer of pH 6.2 containing 0.03M-NaCl as the solvent, and then was subjected to gel-filtration with employment of a column packed with "Sephadex G-75"(trade name of dextra particles for gel-filtration, sold by Pharmacia Co., Uppsala, Sweden) to give purified enzyme of which cephalosporin-synthesizing activity was about 80 times as strong as that of the crude powdery enzyme.

25 $\mu$g. of the purified enzyme was added to 10 ml. of a 0.05 M-phosphate buffer solution of pH 6.0 containing 0.42% of 7-amino-3-deacetoxycephalosporanic acid and 0.80% of D-, L- or DL-phenylglycine methyl ester listed in Table 18 below. Each of the mixtures was incubated under shaking at 37°C for 30 minutes. The amount of accumulated 7-($\alpha$-aminophenylacetamido)-3-deacetoxycephalosphoranic acid was determined by the enzyme assay with regard to the respective reaction mixtures.

The results are summarized in Table 18 below:

Table 18

| Phenylglycine methyl ester | Amount of accumulated product mg/ml |
| --- | --- |
| D-Phenylglycine methyl ester | 1.7 |
| DL-Phenylglycine methyl ester | 0.9 |
| L-Phenylglycine methyl ester | 0.2 |

What is claimed is:

1. A method for producing a cephalosporin compound of the formula

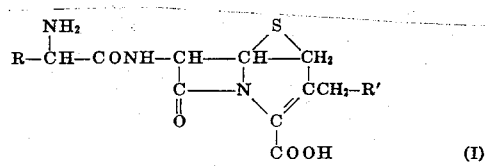

(I)

wherein R stands for a six-membered cyclic hydrocarbon residue or a five-membered heterocyclic residue and R' stands for a hydrogen atom, alkoxy, alkoxycarbonyl, pyridylthio, pyridino, 1-oxidopyrid-2-ylthio, methylthiocarboxy, dimethylthiocarbamyl, trimethylamino, azido or benzyloxycarbonylamino, which comprises subjecting a mixture of (1) an α-substituted-α-amino acid of the formula

or a reactive derivative of the carboxylic moiety which yields the α-substituted-α-amino acid (II) when hydrolyzed in an aqueous medium under the conditions of reaction set forth herein wherein R has the aforementioned significance, and (2) a 7-aminocephem compound of the formula

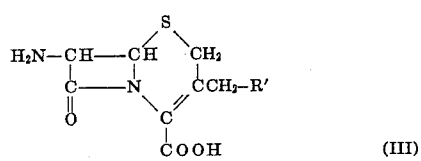

wherein R' has aforementioned significance in an aqueous medium to the enzymatic action of a microorganism which is capable of producing a cephalosporin of the formula (I) from an α-substituted-α-amino acid of the formula (II) or a reactive derivative thereof and a 7-aminocephem compound of the formula (III), the microorganism belonging to a genus *Mycoplana, Protaminobacter, Acetobacter, Xanthomonas, Pseudomonas, Aeromonas, Echerichia, Staphylococcus, Arthrobacter, Proteus, Corynebacterium, Flavobacterium, Clostridium, Spirillum* or *Bacillus*.

2. A method according to claim 1, wherein the α-substituted-α-amino acid or reactive derivative thereof and the 7-aminocephem compound are contacted with a culture broth of the microorganism or with enzyme-containing processed material thereof.

3. A method according to claim 2, wherein the contact is at a temperature from about 5° to about 50°C and at a pH from about 4 to about 8.

4. A method according to claim 2, wherein the concentration of the 7-aminocephem compound in the aqueous medium is in a range from about 0.1 to about 10 percent (weight/volume) and that of the α-substituted-α-amino acid or its reactive derivative is in a range from about 0.1 to about 20 percent (weight/volume).

5. A method according to claim 1 wherein the reactive derivative of the carboxylic moiety is an alkyl ester, a thioester, an amide or a dipeptide between the α-substituted-α-amino acid and another amino acid.

6. A method according to claim 1, wherein the organic radical R' is alkoxy, alkoxycarbonyl, pyridino or 1-oxidopyrid-2-ylthio.

7. A method according to claim 1, wherein R' is a hydrogen atom.

8. A method according to claim 6, wherein R' is methoxy.

9. A method according to claim 6, wherein R' is methoxycarbonyl.

10. A method according to claim 1, wherein the five-membered heterocyclic residue is thienyl.

11. A method according to claim 1, wherein the six-membered cyclic hydrocarbon residue is substituted by hydroxy, halogen or both.

12. A method according to claim 1, wherein R is phenyl.

13. A method according to claim 1, wherein R is phenyl substituted by hydroxy, halogen or both.

14. A method according to claim 1, wherein R is cyclohexenyl.

15. A method according to claim 1, wherein R is cyclohexyl.

16. A method according to claim 1, wherein R is cyclohexenyl and R' is a hydrogen atom, methoxy or methoxycarbonyl.

17. A method according to claim 1, wherein the microorganism is *Mycoplana dimorpha, Mycoplana bullata, Protaminobacter alboflavus, Acetobacter acetosus, Acetobacter albidus, Acetobacter aurantium, Acetobacter cerinus, Acetobacter industrius, Acetobacter dioxyacetonicus, Acetobacter gluconicus, Acetobacter liquefaciens, Acetobacter melanogenus, Acetobacter oxydans, Acetobacter pasteurianus, Acetobacter suboxydans, Acetobacter turbidans, Acetobacter xylinum, Xanthomonas citri, Xanthomonas pruni, Xanthomonas oryzae, Pseudomonas aeruginosa, Pseudomonas maltophila, Pseudomonas melanogenus, Pseudomonas vendrelli, Aeromonas hydrophila, Escherichia coli* or *Escherichia coli var communior*.

* * * * *

UNITED STATES PATENT OFFICE
CERTIFICATE OF CORRECTION

Patent No. 3,816,253          Dated June 11, 1974

Inventor(s) TAKESHI TAKAHASHI ET AL.

It is certified that error appears in the above-identified patent and that said Letters Patent are hereby corrected as shown below:

Column 2, lines 62 - 65, delete "alkoxycarbonyls such as .....hexoxycarbonyl)" and insert therefor --alkylcarbonyloxy such as lower alkylcarbonyloxy (e.g., acetoxy, propionyloxy, isobutyryloxy, propenylcarbonyloxy, hexylcarbonyloxy)--.

IN THE CLAIMS:

Claim 1, lines 6 and 7 (counting the formula as one line), delete "alkoxycarbonyl" and insert therefor --alkylcarbonyloxy--.

Claim 6, line 2, delete "alkoxycarbonyl" and insert therefor --alkylcarbonyloxy--.

Claim 9, lines 1 and 2, delete "methoxycarbonyl" and insert therefor --acetoxy--.

Claim 16, lines 2 and 3, delete "methoxycarbonyl" and insert therefor --acetoxy--.

Signed and Sealed this twenty-seventh Day of April 1976

[SEAL]

Attest:

RUTH C. MASON
*Attesting Officer*

C. MARSHALL DANN
*Commissioner of Patents and Trademarks*